United States Patent [19]

Stonier et al.

[11] 4,284,457
[45] Aug. 18, 1981

[54] METHOD FOR BONDING A SKIN MEMBER TO HONEYCOMB CORE

[75] Inventors: Roger A. Stonier, San Jose; Richard A. Hayes, Foster City, both of Calif.

[73] Assignee: Ford Aerospace & Communications Corp., Detroit, Mich.

[21] Appl. No.: 61,962

[22] Filed: Jul. 30, 1979

[51] Int. Cl.³ .................... B05D 5/10; B29C 31/00; B65C 9/25; B32B 31/00
[52] U.S. Cl. ..................... 156/237; 156/238; 156/322; 156/247; 156/307.3; 427/207.1; 29/DIG. 1
[58] Field of Search ............... 156/237, 238, 309, 322, 156/247, 249, 313, 307.3, 307.5, 290, 300, 301; 427/55, 207 A; 29/DIG. 1

[56] References Cited

U.S. PATENT DOCUMENTS

| | | |
|---|---|---|
| 2,477,852 | 8/1949 | Bacon . |
| 2,609,068 | 9/1952 | Pajak . |
| 3,089,800 | 5/1963 | Colfer et al. . |
| 3,674,595 | 7/1972 | Roeder . |
| 3,700,522 | 10/1972 | Wonderly . |
| 3,723,223 | 3/1973 | LeCompte ............ 427/207 A |
| 3,817,810 | 6/1974 | Ronan et al. . |
| 3,921,368 | 11/1975 | Hanley . |

FOREIGN PATENT DOCUMENTS

48-10611  5/1973  Japan .
54-5558   4/1979  Japan .

*Primary Examiner*—John T. Goolkasian
*Assistant Examiner*—L. Falasco
*Attorney, Agent, or Firm*—Edward J. Radlo; Clifford L. Sadler

[57] ABSTRACT

Described herein is a method for bonding a skin member such as metal, plastic, perforated acoustic skin, or fiberglass or graphite reinforced plastic, to a honeycomb core support structure such as lightweight hollow hexagonally shaped tubes. Such a method can be used in the construction industry for making panels and walls and similar structures, and in the aerospace industry for making airplane and satellite structures, etc. The adhesive employed is an adhesive-coated fabric material which is partially cured onto the honeycomb and cooled down, following which most of the adhesive material is removed when the coated fabric is peeled away. This leaves an optimum amount of adhesive in the most effective locations on the wall edges of the honeycomb cells where it is needed for bonding the core to the skin. The skin member is then bonded to the honeycomb by bringing the adhesive to its final cure. This method thus produces a lightweight structure, and with respect to acoustic panels a structure in which perforations in the skin are not covered or sealed. The method can be used for curved as well as flat honeycomb surfaces.

9 Claims, 9 Drawing Figures

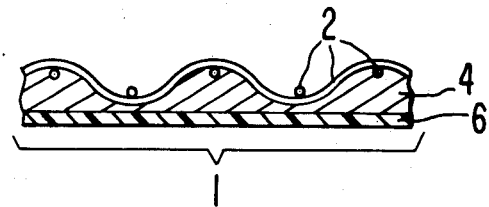
FIG.1
FIG.2
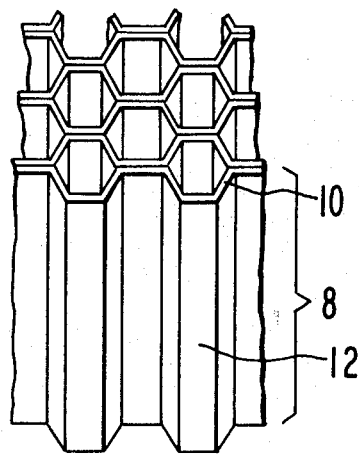
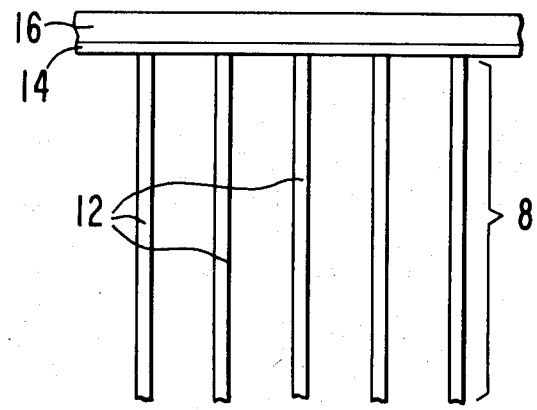
FIG.3
PRIOR ART
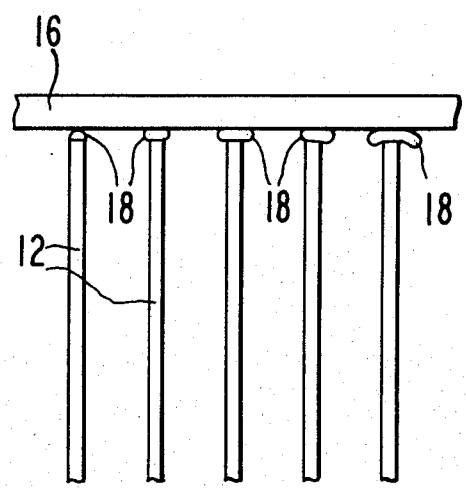
FIG.4
PRIOR ART
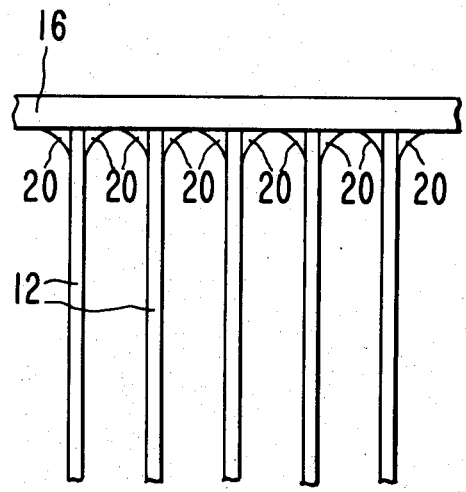
FIG.5
PRIOR ART

METHOD FOR BONDING A SKIN MEMBER TO HONEYCOMB CORE

BACKGROUND OF THE INVENTION

1. Field of the Invention

This invention is a method for bonding a skin member such as metal, plastic, or reinforced plastic, to a honeycomb core material such as a joined set of hexagonally shaped hollow tubular cells. The method has applicability in the construction industry and in the aircraft and satellite manufacturing industries.

2. Description of the Prior Art

A simple prior art approach for bonding metal or another skin member to a honeycomb core material is shown in FIG. 3, wherein skin 16 is attached to the vertical elongated walls 12 of the honeycomb cells. Adhesive layer 14 is applied to skin 16, and this combination is simply placed on top of cell walls 12 with or without pressure and heat. A bond is thus formed between skin 16 and cell walls 12 by using adhesive 14. (The drawings are not drawn to scale in the sense that cell walls 12 are typically thinner than shown). The problem with this method is that it uses a lot of unnecessary adhesive, the weight of which is undesirable in the aircraft and satellite manufacturing industries. The present invention uses half the adhesive (by weight) as this prior art method for the same thickness. Also, this prior art method cannot be used with thin acoustic skins as the precured member 16, since the adhesive 14 would coat and seal up the acoustic perforations in the skin and severely degrade the acoustic properties of the sandwich structure.

Another approach used in the prior art is known as roller coating, exemplified in FIG. 4, wherein a glue or adhesive in liquid or paste form is rolled onto the ends of honeycomb structure 12. The glue is labeled 18. The problem with this method is that it is difficult to control the amount of glue, which is dependent on the skill of the operator. Further, it is impossible to use this method with the newer structural film adhesive materials which tend to have better structural and environmental properties that are desired for satellite and aircraft applications. This method is exemplified by U.S. Pat. No. 2,609,068. This method is also illustrated in U.S. Pat. No. 3,817,810 and results in the adhesive being coated onto the edges of the honeycomb cells only. The method is expensive and can be used only with flat core. It is totally operator dependent and not desirable for high rate production, particularly where reliability and reproducibility of the adhesive coated core is required. On the other hand, the present invention does not require the use of any specialized equipment, is reproducible, and can be used with curved faying honeycomb surfaces.

U.S. Pat. No. 2,477,852 is an old patent covering a glass-fiber honeycomb and the bonding of a noncured material such as a prepreg to the core. This patent does not give details concerning the adhesive but the implication is that either no adhesive is used and the prepreg resin acts as an adhesive, or the roller coating method is used. Column 5 lines 27-30 state, "Additional adhesive may be applied to the attaching surfaces of the core, that is, the end faces of the assembled tubes, to assure thorough sealing at the intersections".

A similar patent is that of U.S. Pat. No. 3,700,522 where again the adhesive goes only on the ends of the cell walls of paper honeycombs. An uncured adhesive is used and is probably applied by roller coating.

A method similar to the roller coating method is known as curtain coating, which utilizes an expensive machine. The curtain coating technique for adhesive application is again limited to liquid adhesive materials. It is difficult to control the curtain coating of honeycombs and only flat surfaces can be coated.

An additional prior art method is the reticulating film adhesive method, illustrated in FIG. 5 of the drawings. In that method an adhesive film with a back-up plastic release film or paper layer is applied to the top surface of the honeycomb, adhering to the edges of the honeycomb cells. Then the back-up release layer is removed and the adhesive, which has formed membranes across the cells of the honeycomb, are burst like bubbles with the simultaneous application of heat and air pressure from above. When the film adhesive membrane "pops" all the adhesive remains and draws back to the core walls as shown as items 20 on FIG. 5. The problems with this method are that too much adhesive remains, and the method can be used only with a special class of reticulating adhesives. It also requires special equipment for rapid heating and applying air pressure to the adhesive covered core.

U.S. Pat. No. 3,674,595 shows a pressure sensitive adhesive applied to a porous substance. The present invention differs from this patent in that a porous substance is not a faying material and a release paper is not used.

U.S. Pat. No. 3,921,368 described freezing a layer of water in a process for gluing together two corrugated paper surfaces.

In U.S. Pat. No. 3,089,800, adhesive is applied to just the raised surfaces of the material to be bonded, unlike the present invention.

None of the above references shows a simple, inexpensive, and reproducible method for bonding a skin member to a honeycomb structure, wherein adhesive is not applied along the surface formed by the joining together of the two members.

SUMMARY OF THE INVENTION

The present invention utilizes an adhesive-coated fabric material such as epoxy coated Dacron (TM) as an adhesive and carrier therefor. This adhesive-coated fabric is applied to each faying surface of the honeycomb, and is partially cured against the core by heating, usually under pressure. This causes some of the adhesive to flow onto the edges of the honeycomb cells. Just prior to bonding, the adhesive-coated fabric treated honeycomb is cooled down, rendering the adhesive in the adhesive coated fabric brittle. The fabric is then removed from the honeycomb by peeling, leaving adhesive inside the cells only in those areas immediately adjacent the cell walls at their ends. Bonding is then accomplished by means of applying the skin member to the adhesive-coated honeycomb and completing the final cure by heating the assembly with either vacuum or pressure, e.g., using a conventional vacuum bagging process.

The method results in a simple operation wherein just the right amount of adhesive is used; too much adhesive would unnecessarily add to the weight; too little would weaken the resulting bond. The adhesive is in locations where its utilization for bonding strength is maximized.

BRIEF DESCRIPTION OF THE DRAWINGS

These and other more detailed and specific objects and features of the present invention are more fully disclosed in the following specification, reference being had to the accompanying drawings, in which:

FIG. 1 is a schematic diagram of a composite adhesive-coated fabric material suitable for use in the present invention;

FIG. 2 is an elevational drawing of a group of honeycomb cells of the type which the present invention bonds to a skin member;

FIG. 3 is a side view of a prior art method wherein an adhesive-coated skin is applied to one face of a honeycomb;

FIG. 4 is a side view of the end result of the roller coating method of the prior art;

FIG. 5 is a side view of the end result of the reticulating method of the prior art;

DESCRIPTION OF THE PREFERRED EMBODIMENT

Figure 6:
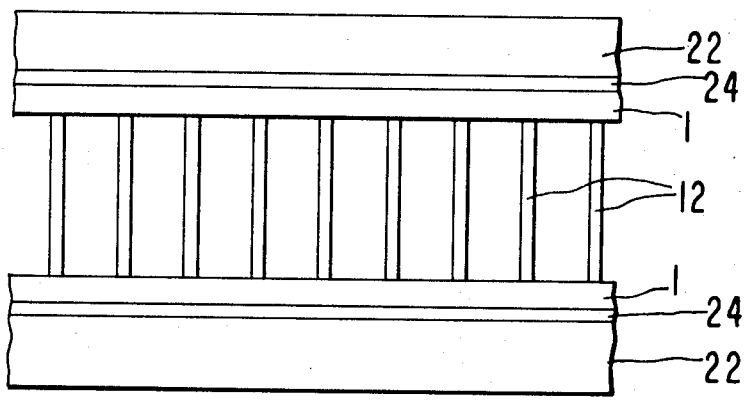
FIG. 6 is a side view of a first step of the present invention.

FIG. 1 is a schematic representation of a composite adhesive-coated fabric material 1 suitable for use in the present invention. Woven fibers 2 are impregnated or coated with uncured adhesive 4. Alternatively, the adhesive could be partially cured. FIG. 1 illustrates the embodiment where fibers 2 have been coated only on its lower side with adhesive 4, rather than totally impregnated with adhesive. Fibers 2 consist preferaly of Dacron (TM) fibers, glass fibers, nylon, rayon, Kevlar (TM) or some other fibers suitable for providing a carrier medium for uncured adhesive 4. Adhesive 4 is a suitable adhesive which cures in stages and becomes brittle when cooled down or frozen. Such an adhesive is an epoxy, a modified epoxy, or a polyimide, for example. Release layer 6 is a film or sheet which provides a means to transport and store adhesive-coated fabric 1 yet provides very low adhesion to fabric 1. A suitable material for such a layer is polyethylene. With the use of release layer 6, adhesive-coated fabric 1 may be stored in a roller form. It is normally kept frozen during storage to inhibit curing of the adhesive. A typical thickness for adhesive-coated fabric suitable for use in the present invention is on the order to 0.010 inches.

FIG. 2 is an elevational view of a portion of a honeycomb that is one of the elements bonded by the present invention. The honeycomb is fabricated of steel, metal, foil, paper, or some other suitable material. Shown in FIG. 2 are a plurality of identical hexagonally shaped hollow cylinders or cells 8 which are joined along elongated cell walls 12. The hexagonal structure has been found to give great strength to the honeycomb while the hollowing out saves weight, highly desirable for sandwich structures to be used in the construction and aerospace industries. The ends of the cells are denominated 10 and together the joined cell ends 10 constitute a face of the honeycomb; thus, the honeycomb illustrated in FIG. 2 has two faces. The size of each cell is typically about 3/16 inch across each end 10 and may vary from ½ inch to several inches in thickness along each wall 12. The drawings are not drawn to scale in the sense that the honeycomb walls 12 are typically thinner than as shown.

A first step of the preferred embodiment of the present invention is illustrated in FIG. 6 wherein a skin member 16 (not shown in FIG. 6), made of, e.g., metal, plastic, or reinforced plastic, is to be bonded to a honeycomb shown as a plurality of vertical honeycomb cell walls 12. In the embodiment illustrated, the honeycomb is shown as having flat faces; however, the present invention can be readily employed in cases where the faying surface of the honeycomb is curbed. FIG. 6 illustrates the case where a caul press comprising upper and lower caul plates 22 are used to provide a uniform pressure during this first step; however, any means of providing uniform pressure could be utilized.

A release layer 24 is attached to each caul plate 22 for purposes of insuring that the adhesive-coated fabric 1 does not adhere to the caul plate. A suitable release layer 24 is Teflon (TM) film or other material which has a high melting point and will not adhere to either the adhesive-coated fabric 1 or the caul plate 22, and will not contaminate the adhesive-coated fabric 1. Adhesive-coated fabric 1 is placed in sheet form on the upper and lower faces of the honeycomb walls 12. This assemblage is heated to the point where the adhesive becomes tacky and adheres to the upper ends 10 of the honeycomb cells.

This is usually accomplished by heating in an oven, e.g., heating to 200° F. and holding at this temperature for 15 minutes. At this point the adhesive is partially cured. Alternatively, depending on the adhesive system used, this heating step might not cure the adhesive at all.

Figure 7:
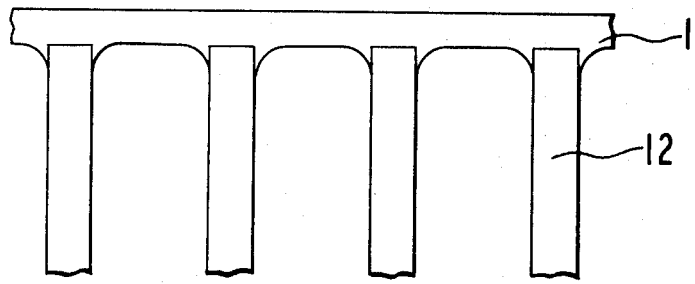
FIG. 7 is a side view of the honeycomb at a second step of the present invention.

FIG. 7 is an illustration of just the top portion of the heated honeycomb showing the part of adhesive from adhesive-coated fabric 1 that has flowed into the interiors of the honeycomb cells near their upper ends 10. A similar phenomenon occurs at the lower surface of the honeycomb.

This assemblage is now removed from the oven and brought to room temperature. In this form the coated honeycomb may be stored at room temperature for up to approximately 30 days, depending upon the curing characteristics of the adhesive-coated fabric selected. The adhesive-coated fabric provides dust and dirt protection for the honeycomb during the storage period.

When it is desired to bond the skin member onto the honeycomb, the coated honeycomb is cooled down to make the adhesive on the coated fabric brittle. Normally it is desirable to bring the temperature of the assemblage to approximately 32° F. by, e.g., placing it in a freezer for a few minutes.

Figure 8:
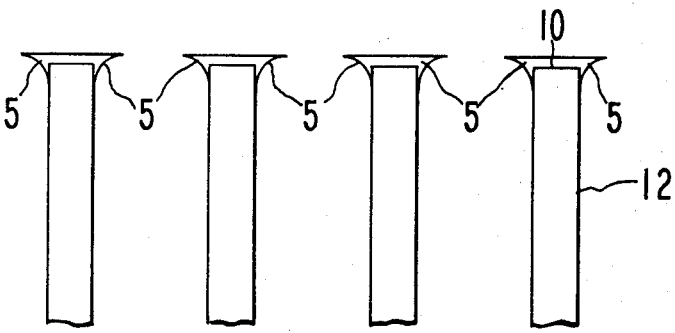
FIG. 8 is a side view of the honeycomb at a third step of the present invention.

The adhesive-coated fabric is then peeled off each face of the honeycomb. This results in all of the fabric being removed, and a large amount of the adhesive being pulled off with the fabric, but leaving a small amount of adhesive 5 remaining adhered to the walls of each cell 8 near the end 10 of each cell wall 12 as is illustrated in FIG. 8.

Figure 9:
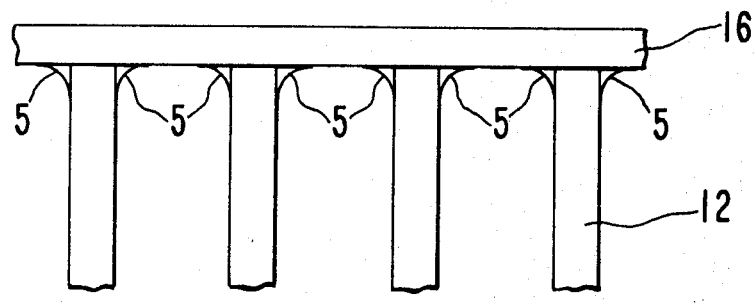
FIG. 9 is a side view of the end result of a cured member bonded to a honeycomb as performed by the present invention.

The operator now dons his gloves so as not to contaminate the adhesive or the skin member, and places the skin member on each faying face of the adhesive-prepared honeycomb. This assemblage is then subjected to final adhesive cure, which entails heating for approximately 60 minutes at 250° F., normally either in a vacuum or under a pressure of about 50 PSI. The exact values of these parameters depend upon the characteristics of the adhesive chosen. The assemblage is removed from the oven and slowly cooled. The result is shown in FIG. 9. Member 16 is bonded to honeycomb walls 12 with adhesive 5 present in sufficient quantity and in the areas where it can provide for a strong bond. Excessive adhesive is not present and therefore weight savings is realized. As a result of the pressure from skin 16, most of the adhesive on cell ends 10 has been pushed into the cells along walls 12, resulting in less adhesive on the surfaces formed by skin 16 and cell ends 10 than in the prior art.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. Method for bonding a skin member to a honeycomb having a faying surface delineating a piecewise demarcated open space, comprising:
   applying an adhesive-coated fabric against the faying surface of the honeycomb;
   heating the fabric covered honeycomb so that some of said adhesive flows out of said fabric and into said honeycomb at a region near said surface in such a way that only part of the open space along the faying surface is covered with adhesive;
   cooling said heated honeycomb so that the adhesive on said fabric becomes brittle;
   peeling said fabric away from said honeycomb so that the only substance remaining adhered to said honeycomb is said flowed adhesive;
   placing said skin member against said surface; and
   imparting a final cure to said adhesive.

2. The method of claim 1 wherein the adhesive-coated fabric is initially in an uncured state.

3. The method of claim 1 wherein said step of heating said fabric covered honeycomb results in the partial curing of said adhesive.

4. The method of claim 1 wherein said step of imparting a final cure includes the application of heat and pressure.

5. The method of claim 1 wherein said step of imparting a final cure includes the application of heat in a vacuum.

6. The method of claim 1 wherein said adhesive-coated fabric comprises synthetic fibers coated with epoxy.

7. The method of claim 1 wherein said skin member is a metal.

8. The method of claim 1 wherein said honeycomb comprises a plurality of hollow hexagonal-cross-section cylinders joined together along their elongated walls.

9. A method for bonding a skin to a face of a honeycomb core, said face having a plurality of regularly-shaped openings, comprising the steps of:
   applying an uncured adhesive-coated fabric against the face;
   heating the fabric covered core so as to partially cure said adhesive in such a way that some of said adhesive flows out of said fabric and partially fills at least some of said openings;
   cooling said fabric covered core to below room temperature so that said adhesive becomes brittle;
   peeling said fabric away from said core so that only said flowed adhesive remains adhered to said face;
   placing said skin against said face; and
   heating and pressurizing said core/skin assembly so as to impart a final cure to said adhesive.

* * * * *